US007313984B1

(12) United States Patent
Eggert et al.

(10) Patent No.: US 7,313,984 B1
(45) Date of Patent: Jan. 1, 2008

(54) UNIVERSAL RETENTION CAVITIES FOR CABLE-MOUNTED REMOTE HOSE CLAMP PLIERS HEADS

(75) Inventors: Daniel M. Eggert, Kenosha, WI (US); Daniel D. Lionberg, Milwaukee, WI (US)

(73) Assignee: Snap-on Incorporated, Kenosha, WI (US)

( * ) Notice: Subject to any disclaimer, the term of this patent is extended or adjusted under 35 U.S.C. 154(b) by 144 days.

(21) Appl. No.: 11/191,112

(22) Filed: Jul. 27, 2005

(51) Int. Cl.

| | |
|---|---|
| ***B25B 27/10*** | (2006.01) |
| ***B25B 7/00*** | (2006.01) |
| ***B25B 11/00*** | (2006.01) |
| ***B25B 25/00*** | (2006.01) |
| ***B23P 19/04*** | (2006.01) |
| ***B23P 19/02*** | (2006.01) |

(52) U.S. Cl. .......................... 81/9.3; 81/424.5; 81/426; 81/486; 29/225; 29/229; 29/235

(58) Field of Classification Search .................. 81/9.3, 81/424.5, 486, 426; 29/243.56, 229, 235, 29/237, 225; 269/257

See application file for complete search history.

(56) References Cited

U.S. PATENT DOCUMENTS

| | | | | |
|---|---|---|---|---|
| 1,330,431 | A * | 2/1920 | De Graff | 81/9.3 |
| 3,111,870 | A | 11/1963 | Anderson | |
| 5,209,143 | A * | 5/1993 | Sweet | 81/9.3 |
| 5,253,554 | A | 10/1993 | Riera et al. | |
| 5,590,573 | A * | 1/1997 | Detable | 81/9.3 |
| 6,189,190 | B1 | 2/2001 | Gillet et al. | |
| 6,363,602 | B1 | 4/2002 | Clark | |
| 6,634,258 | B2 * | 10/2003 | Pool et al. | 81/9.3 |
| 2003/0154823 | A1 * | 8/2003 | Klann | 81/9.3 |
| 2004/0011161 | A1 * | 1/2004 | Gmeilbauer | 81/9.3 |

FOREIGN PATENT DOCUMENTS

DE 197 22 678 C1 3/1999

* cited by examiner

*Primary Examiner*—Joseph J. Hail, III
*Assistant Examiner*—Bryan R. Muller
(74) *Attorney, Agent, or Firm*—Seyfarth Shaw LLP

(57) ABSTRACT

A tool for moving two members relative to each other, such as narrow and wide tangs of an elastic clamp, includes first and second bodies formed substantially identically and operably coupled to each other in spaced, opposing relation, each of the bodies have a substantially lateral channel defining inner back, bottom and front walls therein. Each back wall includes a recess sized and shaped to cooperatively engage the narrow tang of the elastic clamp, when the narrow tang is received in the channel, to substantially retain the lateral position of the narrow tang relative to the body. Each front wall includes an opening for engaging the outward projection of the wide tang when the wide tang is received in the channel, thereby substantially retaining the lateral position of the wide tang relative to the body.

10 Claims, 9 Drawing Sheets

UNIVERSAL RETENTION CAVITIES FOR CABLE-MOUNTED REMOTE HOSE CLAMP PLIERS HEADS

BACKGROUND OF THE INVENTION

The present application relates generally to remotely operated tools, and, more particularly, to a remotely operated tool designed to facilitate removal and installation of elastic clamps, such as hose clamps used to retain radiator and other hoses typically found in an automotive engine compartment.

Elastic clamps are commonly positioned in locations that require remote removal and installation, such as in automobile engine compartments, where commonly the use of fingers or pliers to remove, install or modify the diameter of such clamps is very difficult. As such, many remote tool heads have been created for this purpose. For example, referring to FIG. 1, a prior-art remote tool head 10 includes a first body 11 with a first tab 12 and a second body 13 with a second tab 14. As such, tangs of an elastic clamp are disposed between the first and second tabs 12, 14 wherein a cable structure 15, with one end coupled to the tool head 10 and a remote actuation device coupled to the opposing end, causes the first and second bodies 11, 13 to move linearly relative to each other, thus modifying the diameter of the elastic clamp. However, since elastic clamps are typically substantially circular in shape, in such prior-art tool head it is often difficult to engage and retain the clamp tangs due to the tool head's straight configuration.

Other prior-art remote tool heads for modifying the diameter of elastic hose clamps include separated retention devices that more readily adapt to the curved profile of the elastic clamp. For example, referring to FIGS. 2 to 6B, another prior-art tool head 20 includes a first body 21 and a second body 22. The first body 21 includes a lateral channel 23 and two rods 24 traversing the channel. The rods 24 are spaced from each other and are adapted to receive the narrow tang 101 of an elastic hose clamp 100 therebetween. The second body 22 includes a lateral channel 25 and a generally U-shaped recess 26 communicating therewith. The recess 26 is adapted to receive an outwardly extending protrusion 103 of the wide tang 102 of an elastic hose clamp. However, since each of the first and second bodies 21, 22 is adapted to receive only one of the narrow tang and the wide tang, and cannot receive the other of the tangs, the tool head 20 must be rotated relative to the hose clamp so that the proper body engages the proper tang.

SUMMARY OF THE INVENTION

The present application discloses a tool for moving two members relative to each other, such as radially outwardly extending tangs of a typical, generally circular, elastic hose clamp, for modifying the diameter of the clamp for removal and installation. The tool includes first and second bodies that are substantially identical to each other and are spaced apart in opposing relation and operably coupled to each other with a cable. When the first and second bodies are moved relative to each other, the tangs of the elastic hose clamp are also moved relative to each other, thus manipulating the diameter of the hose clamp. Since the bodies are formed substantially identically, each body can engage either of the narrow or wide tangs of a conventional elastic hose clamp, thus negating the need to rotate the tool head relative to the hose clamp for tang engagement.

Each body includes a generally lateral channel at an upper end thereof having inner back, bottom and front walls. The front wall includes a generally U-shaped opening that is adapted to receive the outward protrusion of the wide tang of a conventional elastic hose clamp, thereby retaining the lateral position of the wide tang relative to the body. In an embodiment, the back wall includes a recess shaped and sized to engage the narrow tang of an elastic hose clamp, thereby substantially retaining the lateral position of the narrow tang relative to the body. In another embodiment, the back wall and the bottom wall respectively include recesses adapted to engage the narrow tang of an elastic hose clamp, thereby substantially retaining the lateral position of the narrow tang relative to the body. In yet another embodiment, the back wall, the bottom wall and the front wall respectively include recesses adapted to engage the narrow tang of a conventional elastic hose clamp, thereby substantially retaining the lateral position of the narrow tang relative to the body.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages, should be readily understood and appreciated.

DETAILED DESCRIPTION

Figure 1:
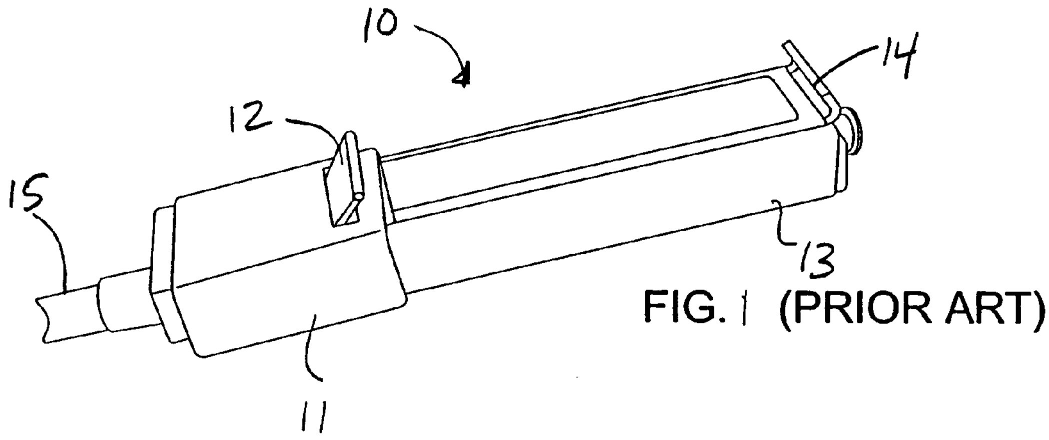
FIG. 1 (PRIOR ART)
FIG. 1 is a perspective view of a prior-art tool head coupled to a head end of a tool cable.
Figure 2:
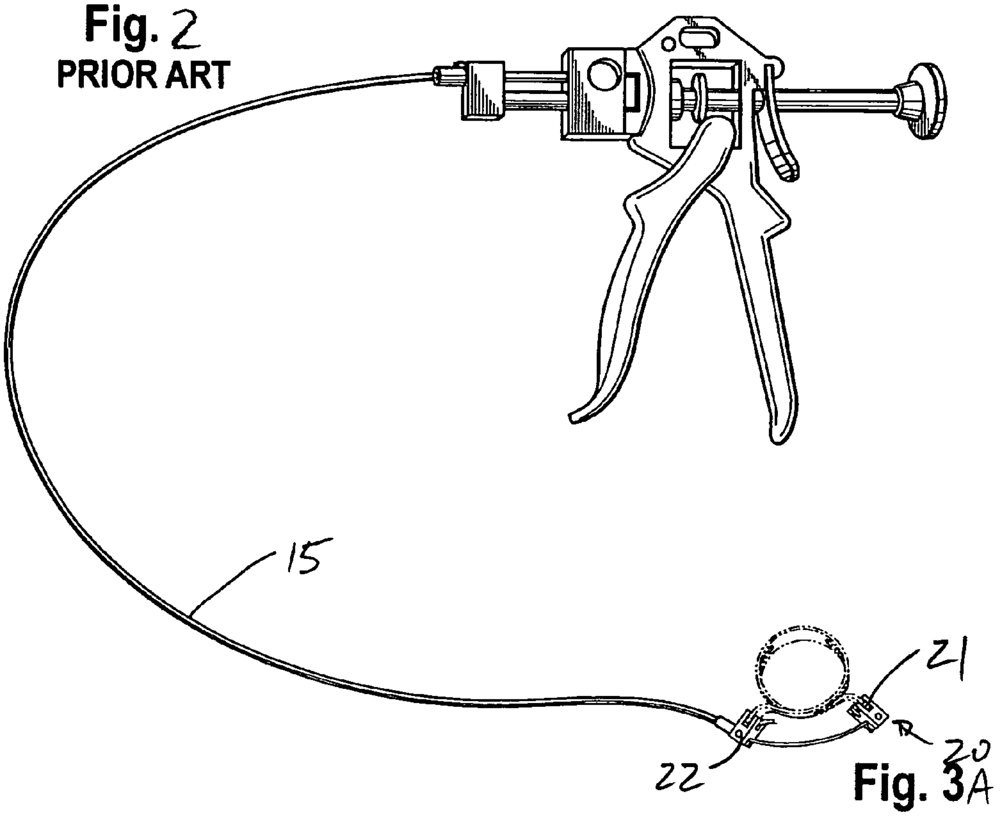
Fig. 2 PRIOR ART
FIG. 2 is a side perspective view of a prior-art tool including a head operably coupled to a hand operated actuation device and engaged with a conventional elastic hose clamp.
Figure 3A:
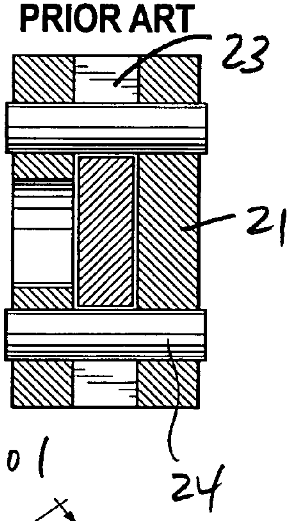
Fig. 3A PRIOR ART
FIG. 3A is a further enlarged cross-sectional view taken along line 3A-3A in FIG. 3.
Figure 3:
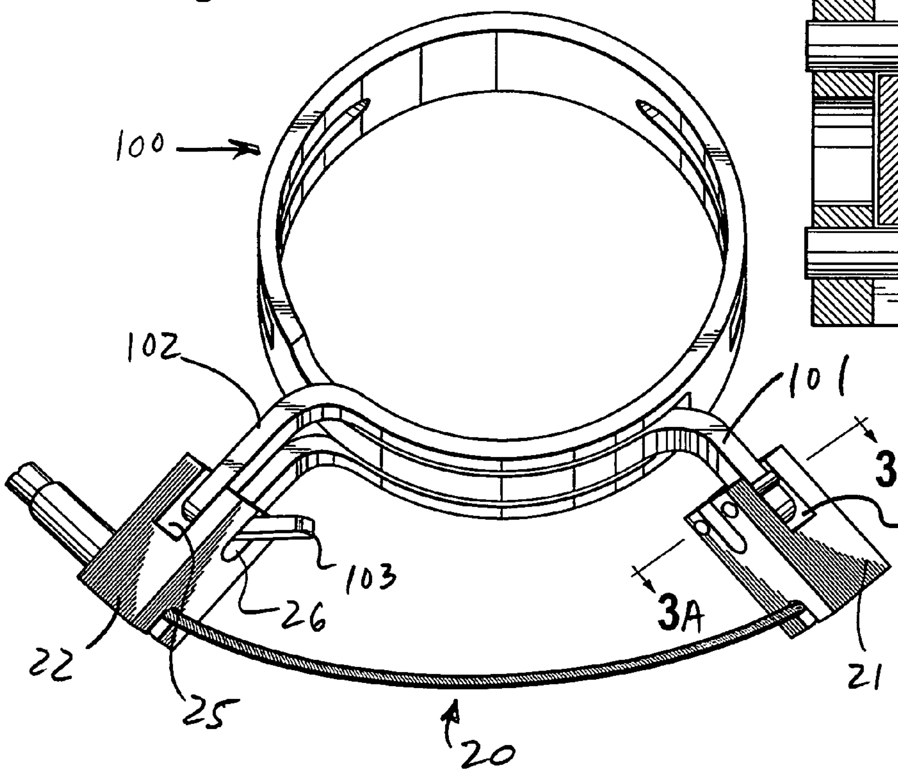
Fig. 3 PRIOR ART
FIG. 3 is an enlarged view of the head assembly and clamp of FIG. 2.
Figure 4:
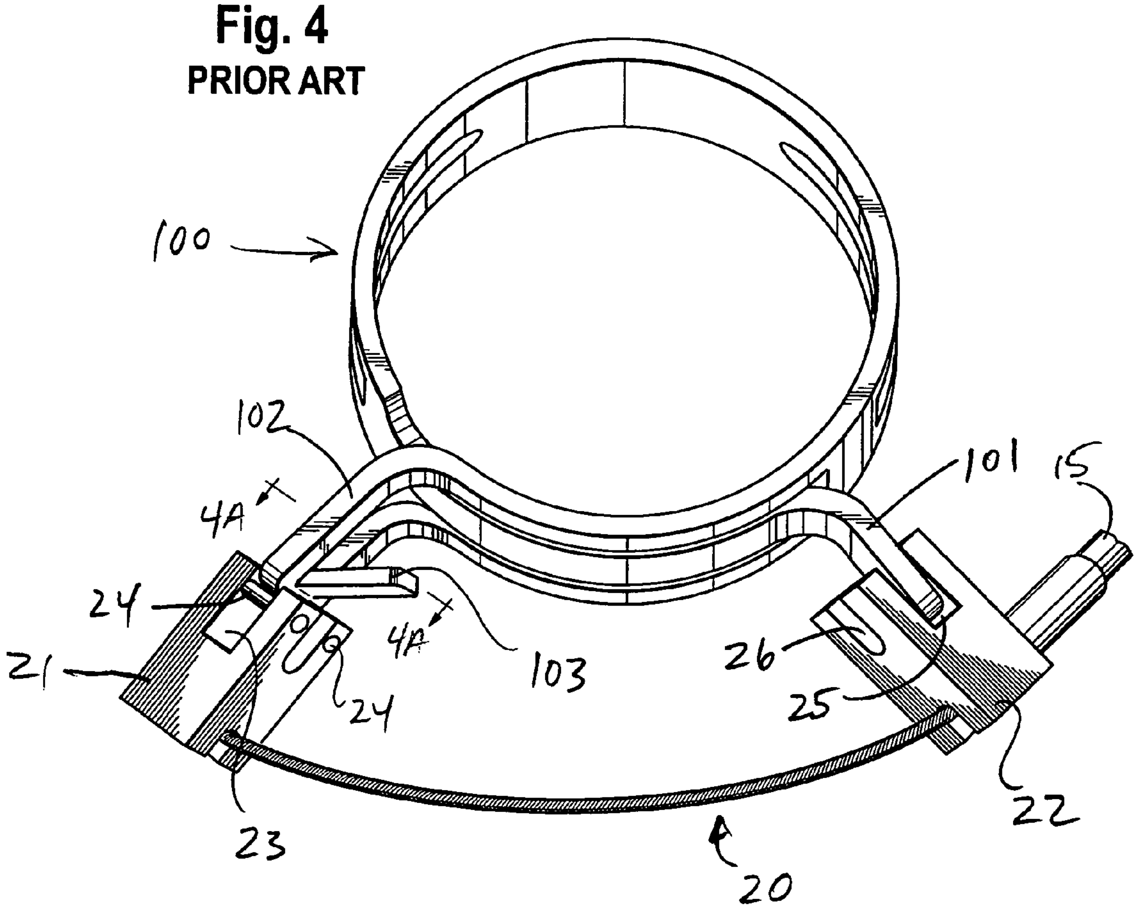
Fig. 4 PRIOR ART
FIG. 4 is a view similar to FIG. 3 depicting the prior-art tool head rotatably reversed for opposing tang engagement.
Figure 4A:
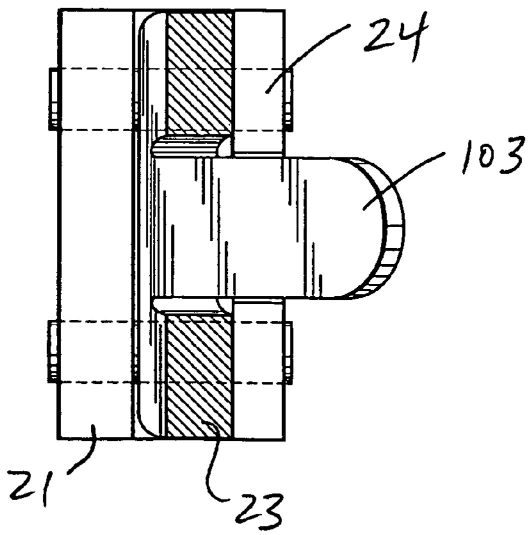
Fig. 4A PRIOR ART
FIG. 4A is an enlarged cross-sectional view taken along line 4A-4A in FIG. 4.
Figure 5A:
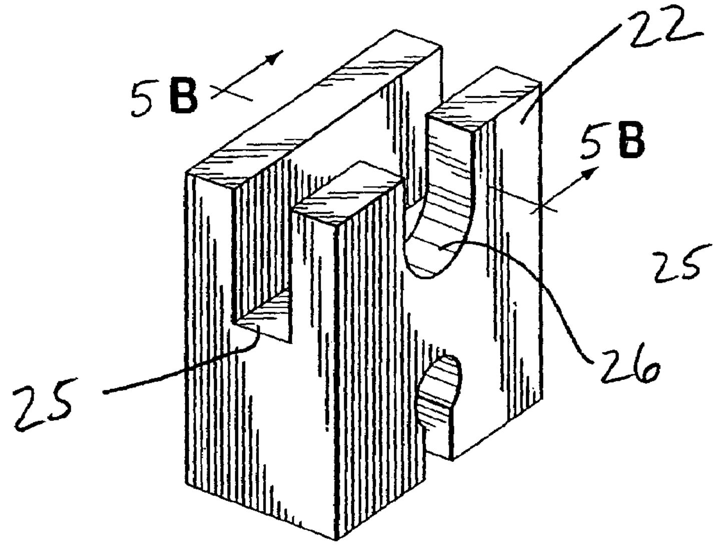
Fig. 5A PRIOR ART
FIG. 5A is an enlarged perspective view of one of the bodies of the prior-art tool head of FIG. 2.
Figure 5B:
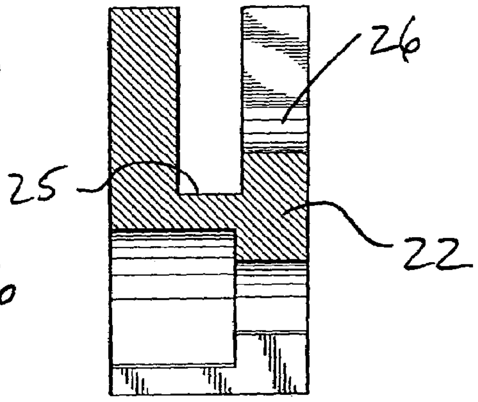
Fig. 5B PRIOR ART
FIG. 5B is a cross-sectional view taken along line 5B-5B in FIG. 5A.
Figure 6A:
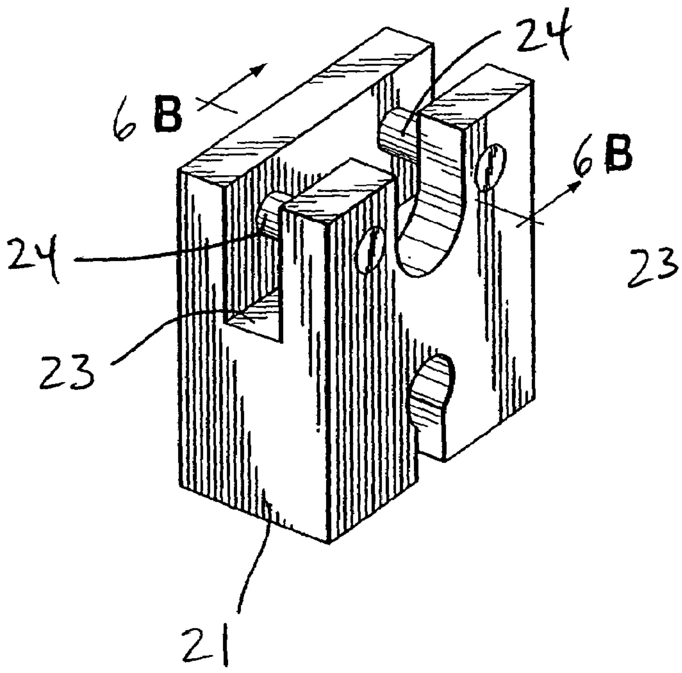
Fig. 6A PRIOR ART
FIG. 6A is an enlarged perspective view of the other one of the bodies of the prior-art tool head of FIG. 2.
Figure 6B:
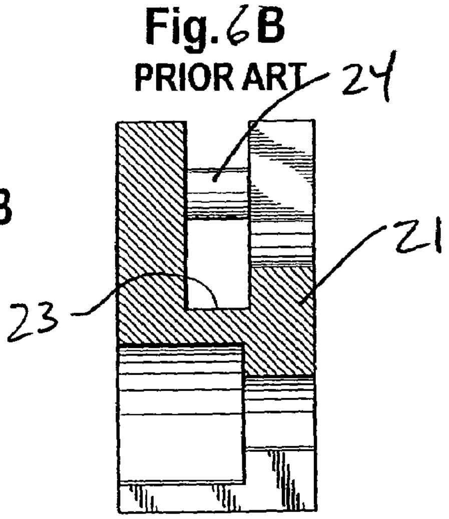
Fig. 6B PRIOR ART
FIG. 6B is a cross-sectional view taken along line 6B-6B in FIG. 6A.
Figure 7:
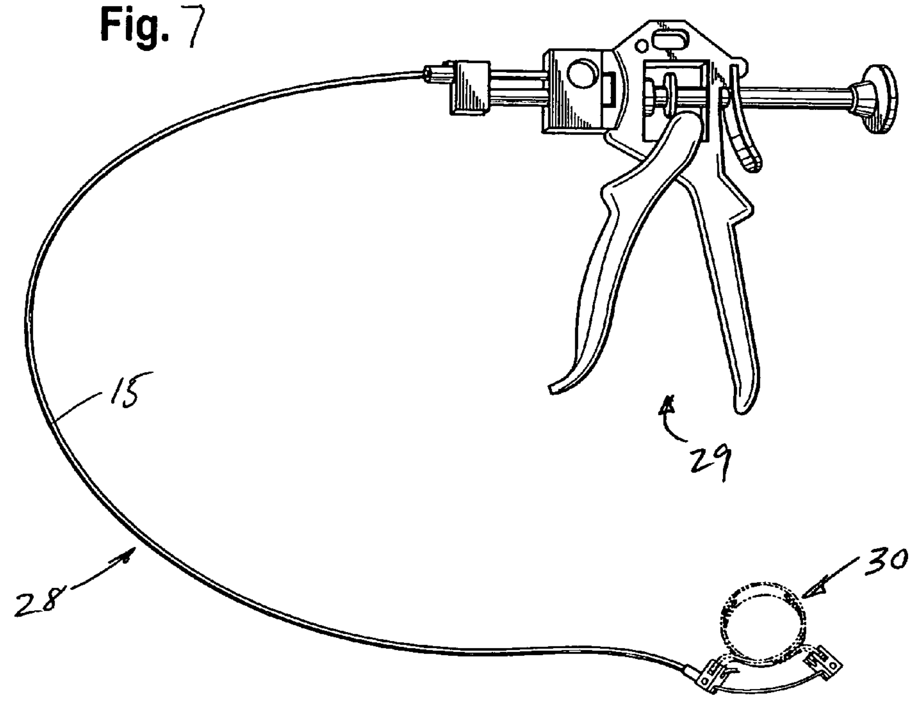
FIG. 7 is a similar to FIG. 2 incorporating an embodiment of the tool head of the present application.
Figure 8:
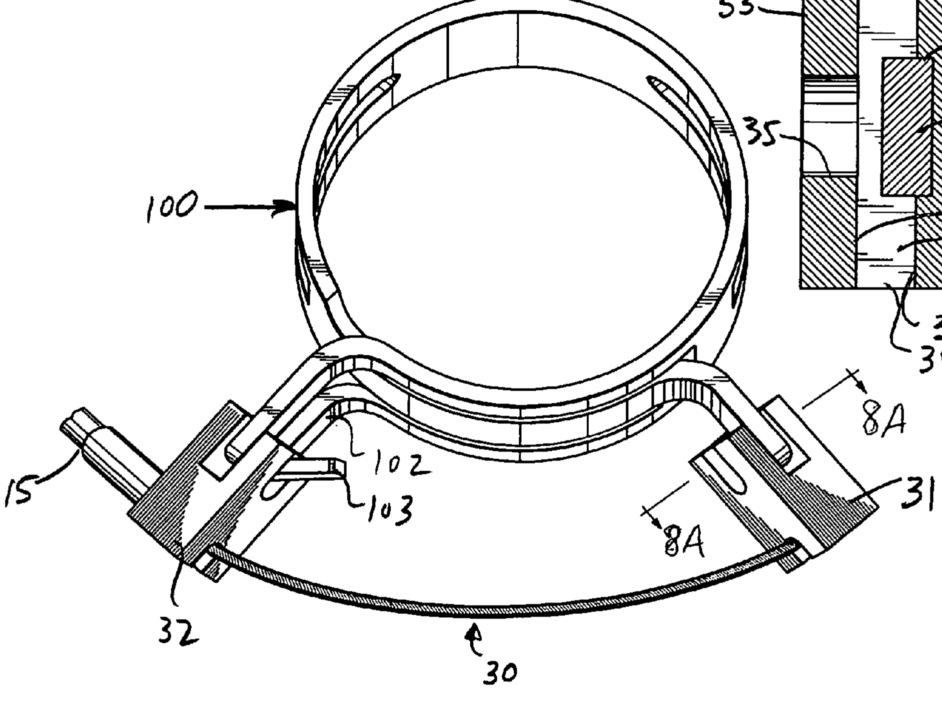
FIG. 8 is a view similar to FIG. 3 of the tool head of FIG. 7.
Figure 8A:
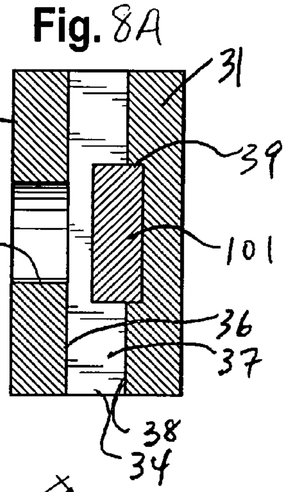
FIG. 8A is an enlarged cross-sectional view taken along line 8A-8A in FIG. 8.

There is disclosed herein a cable-mounted remote hose clamp pliers tool having a tool head with universal retention bodies. Referring to FIGS. 7-8A, in an embodiment, the tool 28 includes a hand-operated actuation device 29 of known instruction coupled to a tool head 30 by a cable structure 15 having first and second ends and is slidably disposed in a sheath. The actuation device 29 may be a hand-held actuator coupled to an end of the cable and the sheath for supplying a substantially rearwardly directed pulling force to the cable relative to the sheath.

The tool head 30 is adapted to move two members relative to each other, such as the radially, outwardly extending first tang 101 and second tang 102 of a conventional, substantially circular, elastic hose clamp 100, to modify the diameter of the hose clamp 100 in a well-known manner. The second tang 102 is wider than the first tang 101 and includes a projection 103 that projects generally toward the first tang 101. The tool head 30 includes a first body 31 and a second body 32 disposed in opposing spaced relation and operably coupled to each other with cable structure 15. It will be appreciated that the first and second bodies 31, 32 are substantially identical to each other and that a description of either one of the bodies is equally applicable to the other of the bodies.

Referring to FIGS. 8-8A, each of the first and second bodies 31, 32 is adapted to receive either the first tang 101 or the second tang 102 of the elastic hose clamp 100. It will be appreciated that relative movement of the narrow tang 101 and the wide tang 102 modifies the diameter of the clamp 100 in a well-known manner.

Figure 9:
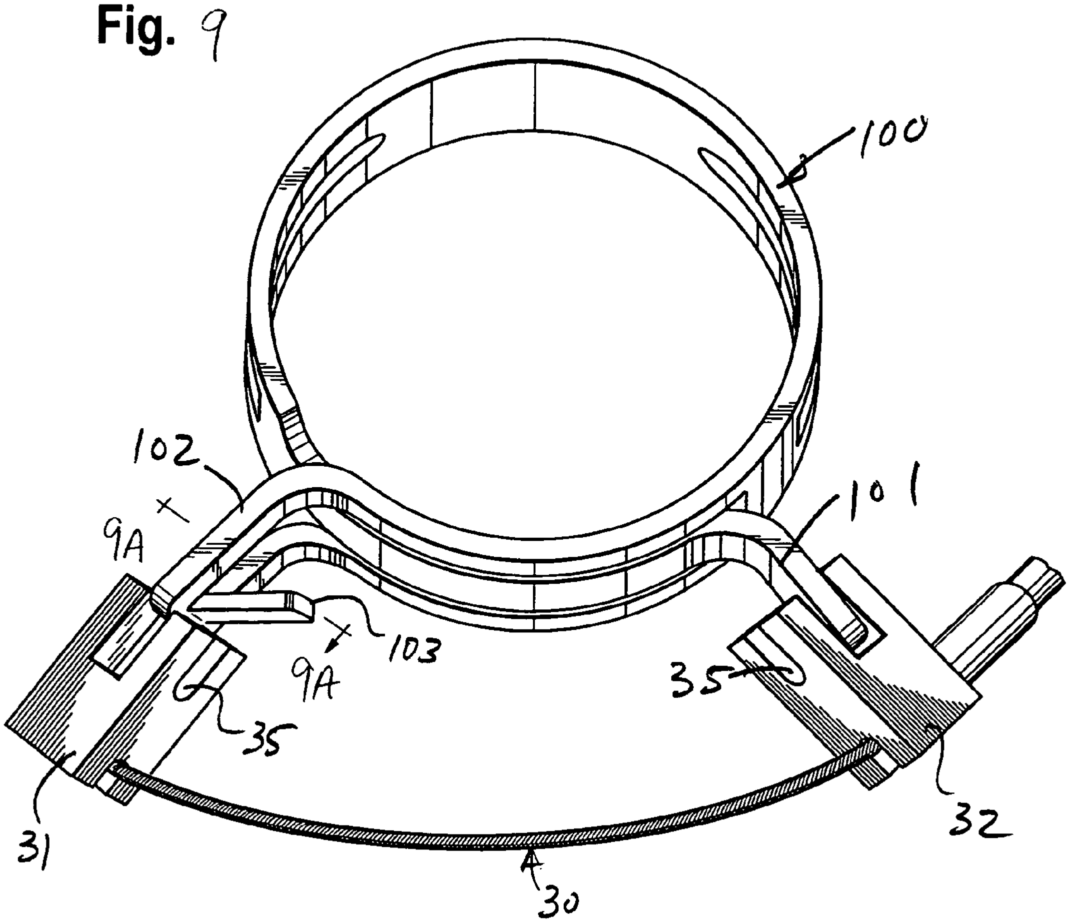
FIG. 9 is a view similar to FIG. 8, but with the tool head rotatably reversed for opposing tang engagement.
Figure 9A:
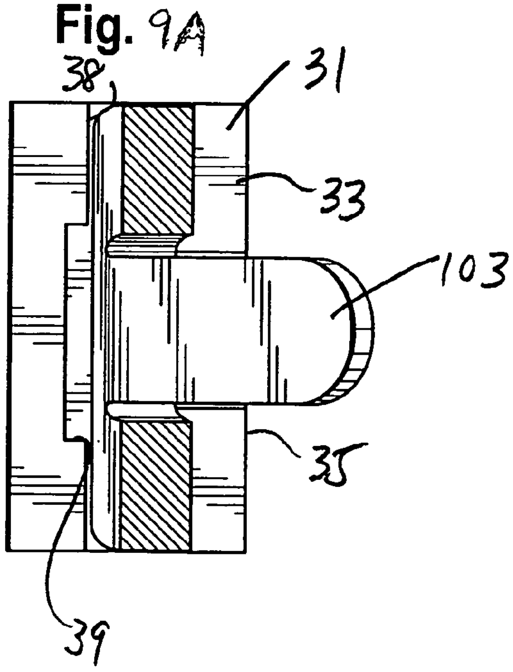
FIG. 9A is an enlarged cross-sectional view taken along line 9A-9A in FIG. 9.
Figure 10A:
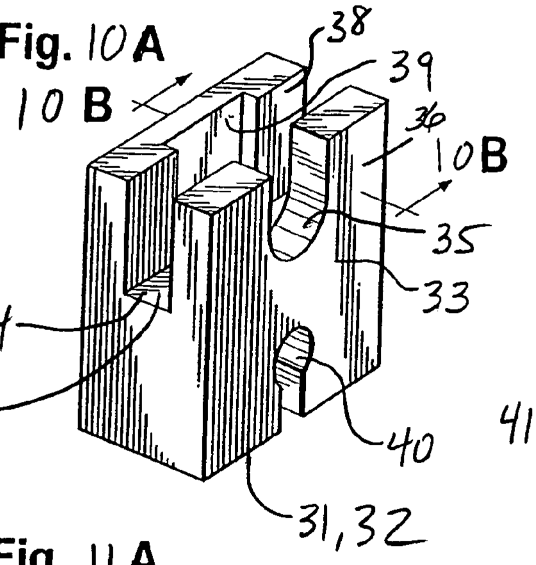
FIG. 10A is an enlarged perspective view of one of the bodies of the tool head depicted in FIG. 7.
Figure 10B:
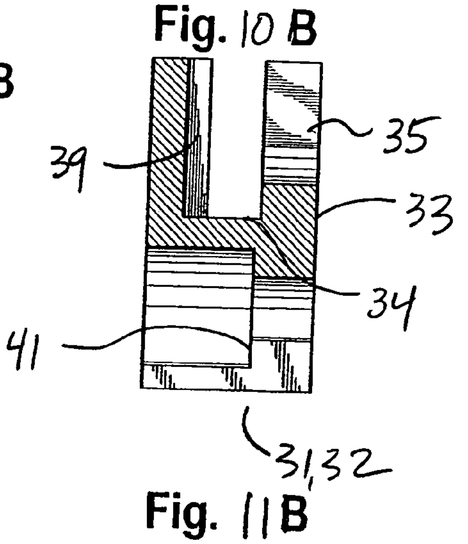
FIG. 10B is a cross-sectional view taken along line 10B-10B in FIG. 10A.
Figure 11A:
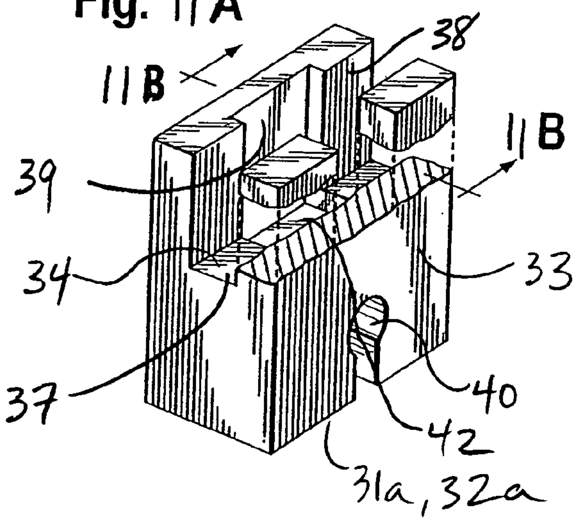
FIG. 11A is a view similar to FIG. 10A showing an alternate embodiment of the tool head of the present application.
Figure 11B:
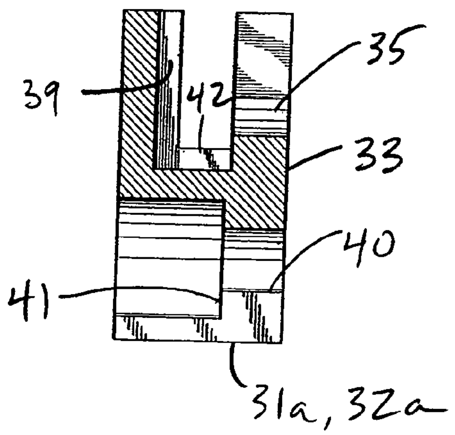
FIG. 11B is a cross-sectional view taken along line 11B-11B in FIG. 11A.
Figure 12A:
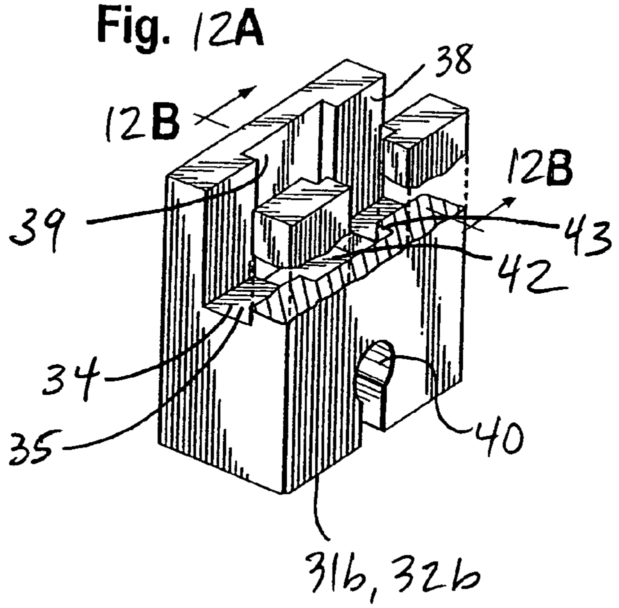
FIG. 12A is a view similar to FIG. 10A showing an alternate embodiment of the tool head of the present application.
Figure 12B:
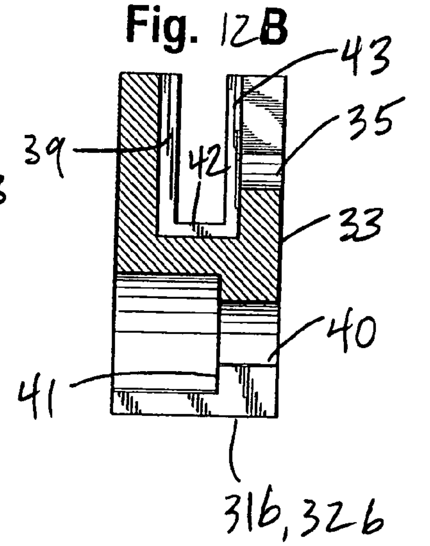
FIG. 12B is a cross-sectional view taken along line 12B-12B in FIG. 12A.
Figure 13A:
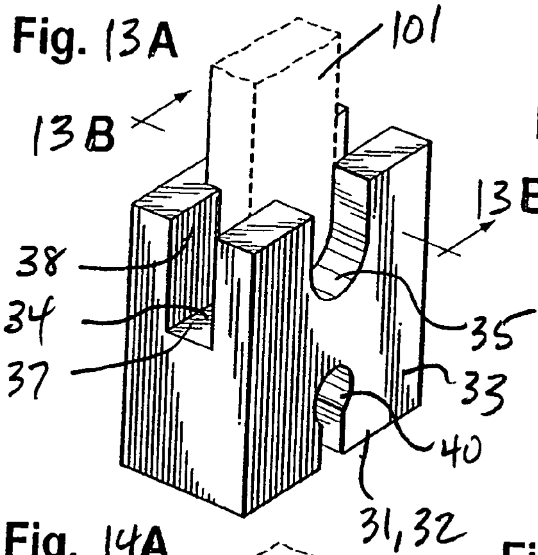
FIG. 13A is a view similar to FIG. 10A, but showing the tool head body engaged with the narrow tang of a conventional elastic hose clamp.
Figure 13B:
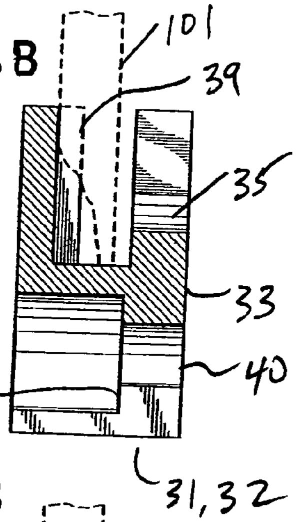
FIG. 13B is a cross-sectional view taken along line 13B-13B in FIG. 13A.
Figure 14A:
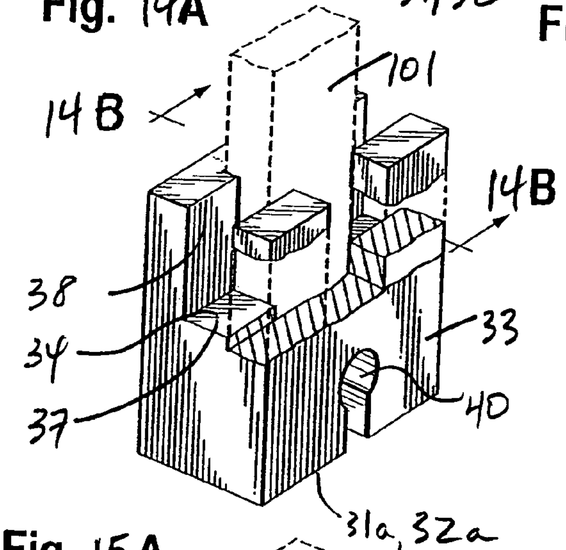
FIG. 14A is a view similar to FIG. 11A, but showing the tool head body engaged with the narrow tang of a conventional elastic hose clamp.
Figure 14B:
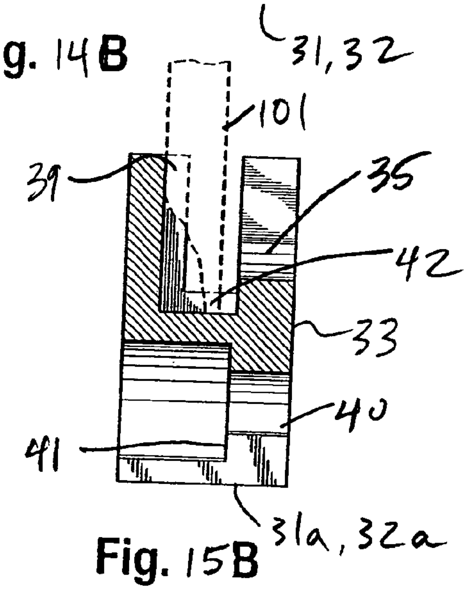
FIG. 14B is a cross-sectional view taken along line 14B-14B in FIG. 14A.
Figure 15A:
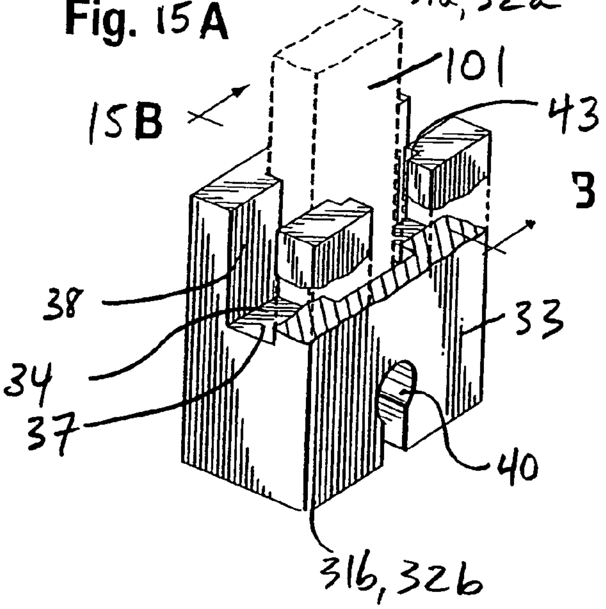
FIG. 15A is a view similar to FIG. 12A, but showing the tool head body engaged with the narrow tang of a conventional elastic hose clamp.
Figure 15B:
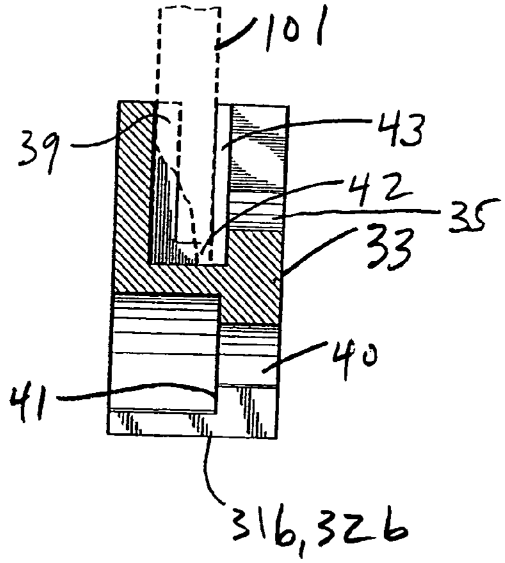
FIG. 15B is a cross-sectional view taken along line 15B-15B in FIG. 15A.
Figure 16A:
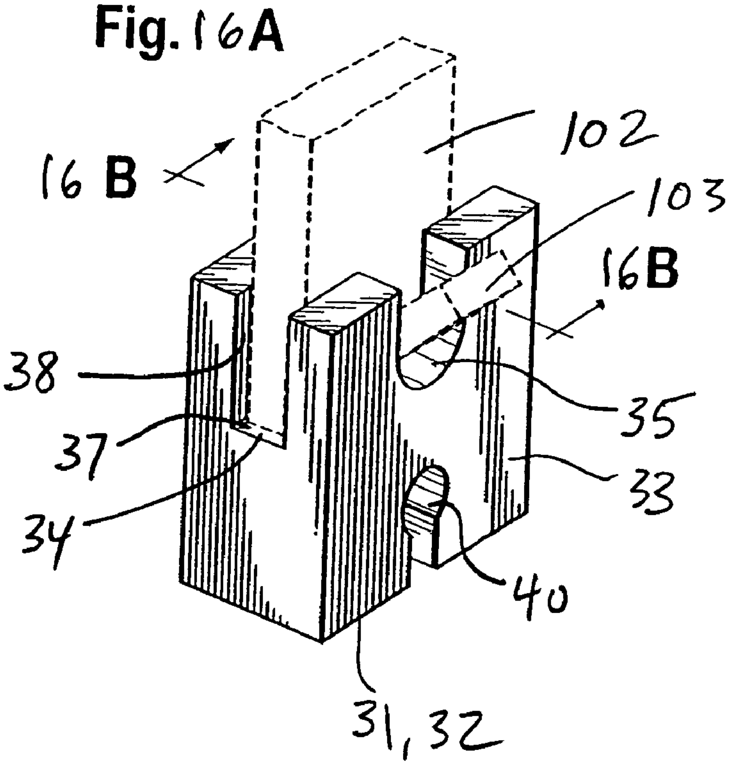
FIG. 16A is a view similar to FIG. 13A, but showing the tool head body engaged with the wide tang of a conventional elastic hose clamp.
Figure 16B:
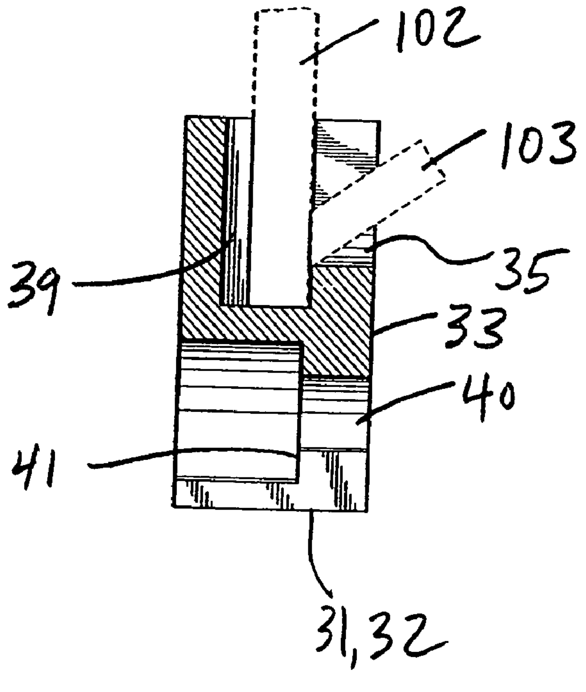
FIG. 16B is a cross-sectional view taken along line 16B-16B in FIG. 16A.

In an embodiment, each of the first and second bodies 31, 32 includes a front face 33, a substantially lateral channel 34 adjacent to the top of the body 31, 32 which defines an inner front wall 36, an inner bottom wall 37 and an inner back wall 38. The front wall 36 includes a generally U-shaped aperture formed in the front face 33 and communicating with the channel 34, and which is adapted to substantially receive the outward projection 103 of the second tang 102 when the second tang 102 is received in the channel 34, thereby substantially retaining the lateral position of the second tang 102 relative to the body 31, 32, as shown in FIG. 9B. Referring also to FIGS. 10A-10B and 13A-13B, in an embodiment, the inner back wall 38 of each body 31, 32 includes a back wall recess 39 which is sized and shaped to cooperatively engage or abut the side walls of the first tang 101, when the first tang 101 is received in the channel 34, to substantially retain the lateral position of the first tang 101 relative to the body 31, 32.

Referring now to FIGS. 11A-11B and 14A-14B, in another embodiment, in both the first and second bodies 31A, 32A, the inner back wall 28 includes a back wall recess 39, which is sized and shaped to cooperatively engage or abut the side walls of the first tang 101, and the inner bottom wall 37 includes a bottom wall recess 42, which is sized and shaped to cooperatively engage or abut the side walls of the first tang 101 adjacent to the terminus of the first tang 101, when the first tang 101 is received in the channel 34, to substantially retain the lateral position of the first tang 101 relative to the body 31A, 32A.

Referring now to FIGS. 12A-12B and 15A-15B, in another embodiment, in both the first and second bodies 31B, 32B, the inner back wall 28 includes a back wall recess 39, which is sized and shaped to cooperatively engage or abut the side walls of the first tang 101, the inner bottom wall 37 includes a bottom wall recess 42, which is sized and shaped to cooperatively engage or abut the side walls of the first tang 101 adjacent to the terminus of the first tang 101, and the inner front wall 38 includes a front wall recess 43, which is sized and shaped to cooperatively engage or abut the side walls of the first tang 101, when the first tang 101 is received in the channel 34, to substantially retain the lateral position of the first tang 101 relative to the body 31B, 32B.

Referring now to FIGS. 10A-16B, in all embodiments, each of the first and second bodies 31, 32, 31A, 32A, 31B, 32B includes a keyhole-shaped aperture 40 adjacent to a bottom side thereof for receiving the cable structure 15 in a well-known manner. The part-circular portion of the aperture 40 has a large-diameter counterbore at the rear end thereof forming with an abutment shoulder 41, which is adapted to seat and retain the sheath of the cable structure 15 in a well-known manner.

In an embodiment, the terminus of the cable structure 15 is operably coupled to a backside of the opposing body in a well-known manner. For example, it may be coupled with a net threadedly engaged with the cable in the terminus of the cable cannot be pulled through the aperture 40.

As shown in FIGS. 8-16B, in all embodiments, it will be appreciated that because the first and second bodies 31, 32, 31A, 32A, 31B, 32B are substantially identical to each other, wherein each can receive either the first tang 101 or the second tang 102 of an elastic hose clamp 100, and since the bodies 31, 32, 31A, 32A, 31B, 32B are operably coupled in opposing spaced relation, wherein the respective front faces 33 substantially face each other, the tool head 30 of the present application provides an easy and efficient means of engaging the first and second tangs 101, 102 of the hose clamp 100 without the need for rotatably reversing the first and second bodies 31, 32 relative to the hose clamp 100. It will further be appreciated that, in all embodiments, in an assembled condition, the part-circular portion of the aperture 40 of the first body 31, 31*a*, 31*b* and second body 32, 32*a*, 32*b*, is adapted to slidably receive the cable structure 15, and the abutment shoulder 41, formed by counterbore of the aperture 40, of the second body 32, 32*a*, 32*b* retains the first end of the sheath of the cable structure 15, and vice-versa, in a well-known manner. It will further be appreciated that, in all embodiments, a generally rearwardly directed force applied to the cable by the actuation device 29 causes the first and second bodes 31, 32, 31A, 32A, 31B, 32B to move relative to each other.

Also disclosed herein is a method of modifying the diameter of an elastic hose clamp having first and second tangs with a tool having a tool head, comprising: providing an actuation device including a cable disposed in a sheath and having a first end; providing a first body having a top and a front face and a substantially lateral channel adjacent to the top defining inner back, bottom and front walls therein and an aperture adjacent to a bottom side of the first body for slidably receiving the cable, the front face having an opening communicating with the channel and being adapted to receive the outward projection of the second tang when the second tang is received in the channel, to substantially retain the lateral position of the second tang relative to the first body, the back wall having a recess that is sized and shaped for cooperatively engaging the first tang when the first tang is received in the channel, to substantially retain the lateral position of the first tang relative to the first body; providing a second body having a second top and a second front face and a substantially lateral second channel adjacent to the second top defining inner back, bottom and front walls and an aperture on a bottom side of the second body coupled to the first end of the cable, the second front face having an opening communicating with the channel and being adapted to receive the outward projection of the second tang when the second tang is received in the channel, to substantially retain the lateral position of the second tang relative to the second body, the back wall having a recess that is sized and shaped for cooperatively engaging with the first tang when the first tang is received in the channel, to substantially retain the lateral position of the first tang relative to the second body, the first and second bodies being disposed in spaced, opposing relation to each other with the respective front faces of the first and second bodies substantially facing each other; and receiving either of the first or second tangs in the first body and receiving the other of the first or second tangs in the second body. The method further includes providing a substantially rearwardly directed force to the cable, thereby causing the first and second bodies to move relative to each other and modifying the diameter of the elastic hose clamp.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

The invention claimed is:

1. A tool head for a tool used for modifying a diameter of an elastic clamp having a substantially circular shape and first and second radially outwardly extending clamp tangs adapted to be moved substantially toward and away from each other to cooperatively modify the diameter of the clamp, the second tang having a width greater than the first tang and including an outward projection extending substantially toward the first tang, the tool head comprising:

a first body having a top, a bottom and a front face and a substantially lateral channel adjacent to the top defining inner back, inner bottom and inner front walls, an opening formed in the front face and communicating with the lateral channel and being adapted to substantially receive the outward projection of the second tang when the second tang is received in the channel, to substantially retain the lateral position of the second tang relative to the first body, and the inner back wall having a recess sized and shaped for cooperatively engaging the first tang when the first tang is received in the channel, to substantially retain the lateral position of the first tang relative to the first body; and a second body having a second top, a second bottom and a second front face and a substantially lateral second channel adjacent to the top defining second inner back, inner bottom and inner front walls, an opening formed in the second front face and communicating with the second channel and being adopted to substantially receive the outward projection of the second tang when the second tang is received in the second channel, to substantially retain the lateral position of the second tang relative to the second body, and the second back wall having a recess that is sized and shaped for cooperatively engaging the first tang when the first tang is received in the second channel to substantially retain the lateral position of the first tang relative to the second body, the first and second bodies being operably coupled to each other and being disposed in spaced, opposing relation, wherein the respective front faces of the first and second bodies substantially face each other;

wherein the second inner front wall includes a recess that is sized and shaped to cooperatively engage the first tang when the first tang is received in the second channel, to substantially retain the lateral position of the first tang relative to the second body.

2. The tool head as claimed in claim 1 wherein the inner bottom wall includes a recess that is sized and shaped to cooperatively engage the first tang, when the first tang is received in the channel, to substantially retain the lateral position of the first tang relative to the first body.

3. The tool head as claimed in claim 1 wherein the inner front wall includes a recess that is sized and shaped to cooperatively engage the first tang when the first tang is received in the channel to substantially retain the lateral position of the first tang relative to the first body.

4. The tool head as claimed in claim 1 wherein the second inner bottom wall includes a recess that is sized and shaped to cooperatively engage the first tang when the first tang is received in the second channel, to substantially retain the lateral position of the first tang relative to the second body.

5. The tool head as claimed in claim 1 wherein the first and second bodies are operably coupled to each other with a cable and are adapted to move towards and away from each other.

6. A tool for modifying a diameter of an elastic clamp having a substantially circular shape and first and second radially outwardly extending clamp tangs adapted to be moved substantially toward and away from each other to cooperatively modify the diameter of the clamp, the second tang having a width greater than the first tang and including an outward projection extending substantially towards the first tang, the tool comprising:

an actuation device including a cable disposed in a sheath and having a first end;

a first body having a top and a front face and a substantially lateral channel adjacent to the top defining inner back, bottom and front walls therein and an aperture adjacent to a bottom side of the first body for slidably receiving the cable, an opening formed in the front face and communicating with the lateral channel and adapted to receive the outward projection of the second tang when the second tang is received in the channel, to substantially retain the lateral position of the second tang relative to the first body, the back wall having a recess that is sized and shaped for cooperatively engaging the first tang when the first tang is received in the channel, to substantially retain the lateral position of the first tang relative to the first body; and a second body having a second top and a second front face and a substantially lateral second channel adjacent to the second top defining inner back, bottom and front walls and an aperture on a bottom side of the second body coupled to the first end of the cable, an opening formed in the second front face and communicating with the second channel and adapted to receive the outward projection of the second tang when the second tang is received in the channel, to substantially retain the lateral position of the second tang relative to the second body, the back wall having a recess that is sized and shaped for cooperatively engaging with the first tang when the first tang is received in the channel, to substantially retain the lateral position of the first tang relative to the second body, the first and second bodies being disposed in spaced, opposing relation to each other with the respective front faces of the first and second bodies substantially facing each other;

wherein the front walls of the first and second bodies respectively include front wall recesses, each front wall recess being sized and shaped to cooperatively engage with the second tang, when the second tang is received in either of the channels.

7. The tool as claimed in claim 6 wherein the sheath abuts a back side of the first body.

8. The tool as claimed in claim 6 wherein the actuation device includes a hand-held actuator coupled to a second end of the cable for supplying a substantially rearwardly directed pulling force to the cable relative to the sheath.

9. The tool as claimed in claim 6 wherein the bottom walls of the first and second bodies respectively include recesses, each recess being sized and shaped to cooperatively engage with the second tang when the second tang is received in either of the channels.

10. A method of modifying a diameter of an elastic hose clamp having first and second tangs with a tool having a tool head, the second tang being wider than the first tang and including an outward projection, comprising the steps of:

providing an actuation device including a cable disposed in a sheath and having a first end;

providing a first body having a top and a front face and a substantially lateral channel adjacent to the top defining inner back, bottom and front walls therein and an aperture adjacent to a bottom side of the first body for slidably receiving the cable, an opening formed in the front face and communicating with the channel adapted to receive the outward projection of the second tang when the second tang is received in the channel, to substantially retain the lateral position of the second tang relative to the first body, the back wall having a recess that is sized and shaped for cooperatively engaging the first tang when the first tang is received in the channel, to substantially retain the lateral position of the first tang relative to the first body;

providing a second body having a second top and a second front face and a substantially lateral second channel adjacent to the second top defining inner back, bottom and front walls and an aperture on a bottom side of the second body coupled to the first end of the cable, an opening formed in the front face and communicating with the lateral channel and adapted to receive the outward projection of the second tang when the second tang is received in the channel, to substantially retain the lateral position of the second tang relative to the second body, the back wall having a recess that is sized and shaped for cooperatively engaging with the first tang when the first tang is received in the channel, to substantially retain the lateral position of the first tang relative to the second body, the first and second bodies being disposed in spaced, opposing relation to each other with the respective front faces of the first and second bodies substantially facing each other;

receiving one of either the first or second tangs in the first body and receiving the other of the first or second tangs in the second body; and applying a substantially rearwardly directed force to the cable, thereby causing the first and second bodies to move relative to each other, wherein the front walls of the first and second bodies respectively include front wall recesses, each front wall recess being sized and shaped to cooperatively engage with the second tang, when the second tang is received in either of the channels.

* * * * *